United States Patent Office 3,081,281
Patented Mar. 12, 1963

3,081,281
COLORING OF SUPER POLYAMIDE RESINS
Jacques Beghin, Menneval, Eure, France, assignor to Organico, S.A., Paris, France, a corporation of France
No Drawing. Filed Oct. 16, 1959, Ser. No. 846,788
7 Claims. (Cl. 260—78)

This invention consists in a novel process of coloring synthetic linear polyamide resins and in the colored product thereby formed.

Polyamide resins useful in this invention constitute the well-known nylon type class of polymers formed typically by the condensation of a diamine and a diacid, or by the condensation of an amino acid, or by the interpolymerization of a mixture of a diamine, a dibasic acid and an amino acid. These materials are characterized by a high melting point, a high molecular weight, and a pronounced crystallinity. They are capable of being formed into such forms as cast structures, sheets and filaments of high strength capable of being drawn into fibers showing by characteristic X-ray patterns orientation along the fiber axis. Typical synthetic linear polyamide resins are known commercially as Nylon, Perlon, or Rilsan. Resins of this general type are described in greater detail in U.S. Patents Nos. 2,071,251; 2,071,253; 2,130,948; 2,252,554; 2,252,555; and 2,252,557. A characteristic of these materials is a long chain molecular structure in which linear molecular fragments consisting of polymethylene chains are joined by amido linkages:

—CO—NH— derived from the condensation reaction between the carboxylic groups and the amino groups.

The present invention provides a novel coloring process which depends upon the formation in situ of chromogens by the reaction of certain poly-functional carboxylic compounds which react with the resin to form the chromogen. The coloring process of this invention accordingly differs from most dying processes in that it does not involve the incorporation of a colored substance into the material to be colored but is rather based on the formation of a chromogen apparently as part of the molecular structure of the polyamide resin.

The poly-functional carboxylic compounds useful in the practice of this invention include:

(1) Aromatic acids having a benzene nucleus or napthalene nucleus having two carboxyl groups in ortho relationship and substituent groups attached to a carbon atom which may be iodine, bromine, chlorine, an amino, or a nitro, and (2) Aliphatic acids having two carboxyl groups separated by a chain of at least one and not more than five carbon atoms and substituent groups attached to a carbon atom on the aliphatic chain which may be iodine, bromine, chlorine, nitro, amino, or hydroxyl.

The anhydrides and esters of the acids, e.g. the methyl, ethyl, propyl, or butyl esters, may be used with equally satisfactory results. Moreover while the compounds are described as containing in each case two carboxylic groups, the presence of additional groups is not detrimental and substituents other than those mentioned may also be present in addition to those mentioned.

By way of specific example the following compounds, in acid, anhydride or in partial or total ester form, may be used:

4-chlorophthalic acid
4-bromophthalic acid
3,6-dichlorophthalic acid
4,5-dichlorophthalic acid
Trichlorophthalic acid
Tetrachlorophthalic acid
Tetrabromophthalic acid
Tetraiodophthalic acid
3-nitrophthalic acid
4-nitrophthalic acid
3-aminophthalic acid
4-aminophthalic acid
Halonaphthalene orthodicarbonic acid
Halonaphthalene peridicarbonic acid
Halodiphenyl o-o′ dicarbonic acid
Dihalo-succinic acid
Dihalomaleic acid
Halo-tartaric acids
Halo-citric acids
Halo-itaconic acids
Halo-pyromellitic acids In carrying out the process, the polyamide resin and the poly-functional carboxylic compound are combined and reacted in any of numerous ways by which the components are brought together under reactive conditions. The polyamide may be melted and mixed with the acid for a period of time sufficient to achieve the color forming reaction, or the acid may be added to the monomers of which the polymer is formed, or the polymer may be dissolved in a solvent to form a solution to which the acid is added.

The amount of acid required is generally between 0.1 and 5% of the weight of the polyamide to be colored. It is generally unnecessary to use more acid than necessary to saturate the amido groups of the polymer, but excess of acid is not detrimental.

A coloring substance useful to color other plastics such as polyamides, polyesters, polyethylene, polyacrylonitrile, polystyrene, cellulose derivatives, epoxide resins, aminoplasts, etc., may be made by reacting the acid with an equal molar proportion of polyamide forming monomer, which is then heated to about 150° C. for an hour in an inert atmosphere. A frangible mass is obtained which may be powdered and then utilized as dyestuff for other plastics.

The colors obtained by the process of this invention are generally fluorescent in nature and vary from yellow to orange-red to blue-green. The colors are part of the polyamide molecule itself and are accordingly distributed homogeneously throughout the material. They are moreover extremely stable to heat and to ordinary physical and chemical reagents. The coloring provided by the process may be utilized itself as the color of the final material or may be utilized to modify colors additionally added in ordinary manners.

The colored polyamide resin may be processed in the usual manner and formed into sheets, cast structures or fibers with or without the addition of other additives such as fillers, plasticizers, fire retardants and anti-static agents, all in accordance with well-known practice.

Where polyamide resin stock is to be colored according to the process of this invention a suitable technique consists in combining the resin stock (e.g. as granules) and the acid and then melting the resin with thorough mixing, following which the molten resin may be processed in conventional manner. The color reaction occurs generally within a few minutes, although with some acids a period as long as an hour may be required. If desired, the heating may be prolonged without detrimental effect to the coloration.

Another manner of coloring resin stock consists in dissolving the resin in a suitable solvent, and adding the acid to the solution which is preferably heated to at least 140° C., under pressure if necessary. Under these conditions the reaction occurs rapidly, depending of course on the temperature. The colored resin may then be precipitated from the solution to yield a fine color powder suitable for sintering and coating applications. In this respect, forming the colored resin in situ in solution has been found to be an efficient and satisfactory means of obtaining a colored powder and is preferable to dissolving the precolored polyamide in the solution and then precipitating it out.

Where polyamides are processed from their monomers, the color-forming acid may be added to the monomers preliminary to the condensation reaction, and color readily develops in the resin ultimately formed.

Representative examples of preferred methods of carrying out this invention are described in detail in the following examples:

*Example I*

5 parts by weight of 4-chlorophthalic anhydride and 1000 parts of Nylon 6–6 (polyhexamethylene adipamide) granules are melted and mixed and are then fed through a screw extruder to conventional sheeting apparatus, for instance as is disclosed in co-pending application of Jean-Henri Seurin and Alexis Le Seguillon, Serial No. 667,627, filed June 24, 1957. A yellow intense fluorescent color is developed homogeneously throughout the resin which is uneffected by heat and light. The colored resin may be molded or spun by well-known conventional processes. The same results are obtained when Rilsan (Nylon 11, the polymer of 11-aminoundecylic acid) or Perlon (Nylon 6, the polymer of caprolactam) is used instead of Nylon 6–6.

*Example II*

1000 parts by weight of Perlon and 2 parts of tetrachlorophthalic anhydride are mixed together and melted. A yellow greenish fluorescent color develops in the mass of resin which may then be processed in conventional manner.

*Example III*

In an autoclave containing 11-amino-undecylic acid preliminary condensation is added 0.5% by weight of tetrachlorophthalic acid. The condensation is carried out in the usual manner to produce a Rilsan resin having a fluorescent red orange tint.

*Example IV*

1000 parts by weight of Nylon 6–6 and 3 parts of bromophthalic anhydride are melted together and fed into an extruder in the manner described in Example I. After several minutes a green blue fluorescent tint is developed in the resin which may then be processed in any desired manner.

*Example V*

1000 parts by weight of polyundecanamide and 10 parts of butyl tartrate are mixed together and melted. A yellow color quickly develops in the resin which may then be molded or extruded to yellow color articles. This particular product is characterized by an increased flexibility.

*Example VI*

10 parts by weight of 3-nitrophthalic anhydride, C.P. grade, are mixed with 1000 parts by weight of Nylon 6 and the mixture is milled together in a Banbury mill. A yellow fluorescent heat stable color is developed in the resin which may then be processed in conventional manner.

*Example VII*

10 parts by weight of 3-aminophthalic anhydride, C.P. grade, and 1000 parts of polyundecanamide are mixed and melted together. A yellow fluorescent color is developed in the resin which may then be processed in conventional manner.

*Example VIII*

10 parts by weight of bromo-succinic anhydride and 1000 parts of polyundecanamide are mixed and melted together to yield a yellow colored resin which may be processed in conventional manner.

*Example IX*

10 parts by weight of chloromaleic acid and 1000 parts by weight of Nylon 6 are milled together in a Banbury mill and are then melted. A yellow color develops in the molten mass which may then be extruded or molded in conventional manner.

*Example X*

5 parts by weight of 4-bromo 1,8-naphthalene dicarbonic acid and 1000 parts by weight of polyundecanamide are mixed and melted together. A yellow green fluorescent color is developed in the molten mass which may then be processed in conventional manner.

*Example XI*

A colored powder is formed in accordance with any of the preceding examples as by grinding colored resin, or by dissolving it in a hot solvent and subsequently precipitating it out of solution. The powder may be applied to the surface of an article to be colored and formed into a uniform coating by heating the article to above the melting point of the resin. A convenient method of applying the powder consists in suspending it in a stream of cold inert gas directed at the article after the latter has been heated to the required temperature. The article is then simultaneously coated with colored resin and cooled in the stream of gas.

*Example XII*

10 kg. of polyundecanamide, 40 liters butanol and 50 grams of tetrachlorophthalic acid are mixed together and heated in an autoclave at a temperature of 140° C. for an hour. The mixture is then cooled to yield a yellow fluorescent colored powder which is separated, washed and dried. This powder may be formed into articles by sintering, or may be used to form a colored surface coating, for instance as described in Example XI.

*Example XIII*

288 grams of tetrachlorophthalic anhydride and 201 grams of poly 11-aminoundecanamide are mixed in a round flask and heated in an inert gas atmosphere at 255° C. for an hour. A frangible orange mass is formed, having a melting point of 175° C. The orange material may be used as a dyestuff for plastics in accordance with conventional techniques.

*Example XIV*

4580 grams of tetrachlorophthalic anhydride and 1825 grams of caprolactam are combined in an autoclave and then heated in an inert atmosphere at 190° C. for an hour. A frangible orange mass is formed which may be used for coloring other plastics by conventional techniques.

The foregoing examples have been selected as representative of this invention. In view of the numerous acids useful in the process and the numerous types of polyamide resins known to the art a great number of formulations will be readily apparent to those skilled in the art and acquainted with the instant disclosure. It is accordingly contemplated that numerous modifications from the details of the above examples may be made without departing from the scope of this invention.

This application is a continuation-in-part of applicant's copending application Serial No. 673,754, filed July 24, 1957.

Having thus disclosed my invention and described in detail preferred embodiments thereof, I claim and desire to secure by Letters Patent:

1. The method of coloring synthetic linear polycarbonamide resins consisting of polymethylene chains joined by the amido linkages —CO—NH—, and having a molecular weight sufficient for fiber formation, comprising combining said resin with at least about 1.001 part by weight per part of resin of a poly-functional carboxylic compound reactive with said resin to form a chromogen and selected from the group consisting of: aromatic acids having an aromatic nucleus selected from the group consisting of the benzene nucleus and the naphthalene nucleus and having two carboxyl groups attached to the aromatic nucleus in ortho relationship and at least one substituent group attached to the aromatic nucleus from the class consisting of iodine, bromine, chlorine, amino, and nitro; aliphatic acids having two carboxyl groups separated by a chain of at least one and not more than five carbon atoms and having at least one substituent group attached to a carbon atom of said chain from the class consisting of iodine, bromine, chlorine, nitro, amino, and hydroxyl; the anhydrides of said acids; and the esters of said acids.

2. The method of coloring synthetic linear polycarbonamide resins consisting of polymethylene chains joined by the amido lingages —CO—NH—, and having a molecular weight sufficient for fiber formation, comprising combining said resin with between about 0.001 and 0.05 part by weight per part of resin of a poly-functional carboxylic compound reactive with said resin to form a chromegen and selected from the group consisting of: aromatic acids having an aromatic nucleus selected from the group consisting of the benzene nucleus and the naphthalene nucleus and having two carboxyl groups attached to the aromatic nucleus in ortho relationship and at elast substituent group attached to the aromatic nucleus from the class consisting of iodine, bromine, chlorine, amino, and nitro; aliphatic acids having two carboxyl groups separated by a chain of at least one and not more than five carbon atoms and having at least one substituent group attached to a carbon atom of said chain from the class consisting of iodine, bromine, chlorine, nitro, amino, and hydroxyl; the anhydrides of said acids; and the esters of said acids.

3. The method of coloring synthetic linear polycarbonamide resins consisting of polymethylene chains joined by the amido linkages —CO—NH—, and having a molecular weight sufficient for fiber formation, comprising melting said resin and mixing said molten resin with between about 0.001 and 0.05 part by weight per part of resin of a poly-functional carboxylic compound reactive with said resin to form a chromogen and selected from the group consisting of: aromatic acids having an aromatic nucleus selected from the group consisting of the benzene nucleus and the naphthalene nucleus and having two carboxyl groups attached to the aromatic nucleus in ortho relationship and at least one substituent group attached to the aromatic nucleus from the class consisting of iodine, bromine, chlorine, amino, and nitro; aliphatic acids having two carboxyl groups separated by a chain of at least one and not more than five carbon atoms and having at least one substituent group attached to a carbon atom of said chain from the class consisting of iodine, bromine, chlorine, nitro, amino, and hydroxyl; the anhydrides of said acids; and the esters of said acids.

4. The method of coloring synthetic linear polycarbonamide resins consisting of polymethylene chains joined by the amido linkages —CO—NH—, and having a molecular weight sufficient for fiber formation, comprising dissolving said resin in a solvent therefor and mixing said solution at elevated temperature with between about 0.001 and 0.05 part by weight per part of resin of a poly-functional carboxylic compound reactive with said resin to form a chromogen and selected from the group consisting of: aromatic acids having an aromatic nucleus selected from the group consisting of the benzene nucleus and the naphthalene nucleus and having two carboxyl groups attached to the aromatic nucleus in ortho relationship and at least one substituent group attached to the aromatic nucleus from the class consisting of iodine, bromine, chlorine, amino, and nitro; aliphatic acids having two carboxyl groups separated by a chain of at least one and not more than five carbon atoms and having at least one substituent group attached to a carbon atom of said chain from the class consisting of iodine, bromine, chlorine, nitro, amino, and hydroxyl; the anhydrides of said acids; and the esters of said acids.

5. In the manufacture of synthetic linear polycarbonamide resins consisting of polymethylene chains joined by the amido linkages —CO—NH—, and having a molecular weight sufficient for fiber formation whereby material including amino groups and carboxyl groups is caused to condense to form said resin, the method of coloring said resin comprising adding to said material between about 0.001 and 0.05 part per part of resin of a poly-functional carboxylic compound reactive with said resin to form a chromogen and selected from the group consisting of: aromatic acids having an aromatic nucleus selected from the group consisting of the benzene nucleus and the naphthalene nucleus and having two carboxyl groups attached to the aromatic nucleus in ortho relationship and at least one substituent group attached to the aromatic nucleus from the class consisting of iodine, bromine, chlorine, amino, and nitro; aliphatic acids having two carboxyl groups separated by a chain of at least one and not more than five carbon atoms and having at least one substituent group attached to a carbon atom of said chain from the class consisting of iodine, bromine, chlorine, nitro, amino, and hydroxyl; the anhydrides of said acids; and the esters of said acids.

6. In the manufacture of synthetic linear polycarbonamide resins consisting of polymethylene chains joined by the amido linkages —CO—NH—, and having a molecular weight sufficient for fiber formation whereby material including amino groups and carboxyl groups is caused to condense to form said resin, the method of coloring said resin comprising adding to said material about an equal molar amount of a poly-functional carboxylic compound reactive with said resin to form a chromogen and selected from the group consisting of: aromatic acids having an aromatic nucleus selected from the group consisting of the benzene nucleus and the naphthalene nucleus and having two carboxyl groups attached to the aromatic nucleus in ortho relationship and at least one substituent group attached to the aromatic nucleus from the class consisting of iodine, bromine, chlorine, amino, and nitro; aliphatic acids having two carboxyl groups separated by a chain of at least one and not more than five carbon atoms and having at least one substituent group attached to a carbon atom of said chain from the class consisting of iodine, bromine, chlorine, nitro, amino, and hydroxyl; the anhydrides of said acids; and the esters of said acids.

7. The polycarbonamide of the process defined by claim 1.

References Cited in the file of this patent

UNITED STATES PATENTS

| | | |
|---|---|---|
| 2,176,074 | Jacobson | Oct. 17, 1939 |
| 2,408,700 | Sprung | Oct. 1, 1946 |
| 2,525,753 | Yutzy et al. | Oct. 10, 1950 |
| 2,570,180 | Allewelt | Oct. 9, 1951 |
| 2,839,505 | Ross et al. | June 17, 1958 |